United States Patent [19]

Binnig et al.

[11] Patent Number: 4,605,194

[45] Date of Patent: Aug. 12, 1986

[54] HIGH-PERFORMANCE VIBRATION FILTER

[75] Inventors: Gerd Binnig, Richterswil; Christoph Gerber, Adliswil; Heinrich Rohrer, Richterswil; Edmund Weibel, Adliswil, all of Switzerland

[73] Assignee: International Business Machines Corporation, Armonk, N.Y.

[21] Appl. No.: 505,533

[22] Filed: Jun. 17, 1983

[30] Foreign Application Priority Data

Aug. 13, 1982 [EP] European Pat. Off. ........ 82107380.6

[51] Int. Cl.$^4$ ............................................. F16M 13/00
[52] U.S. Cl. ..................................... 248/559; 248/581
[58] Field of Search ............... 248/559, 562, 610, 611, 248/638, 636, 581, 589, 603, 612, 613; 267/151; 188/167

[56] References Cited

U.S. PATENT DOCUMENTS

| | | | |
|---|---|---|---|
| 118,919 | 9/1871 | Foote | 248/581 |
| 1,795,313 | 3/1931 | Nies | 248/581 |
| 3,223,400 | 12/1965 | Deister | 248/613 X |
| 3,845,929 | 11/1974 | Reekie et al. | 248/562 |
| 3,868,082 | 2/1975 | Soderquist | 248/636 X |

FOREIGN PATENT DOCUMENTS

| | | | |
|---|---|---|---|
| 673210 | 2/1939 | Fed. Rep. of Germany | 248/603 |
| 190142 | 11/1982 | Japan | 188/267 |
| 570243 | 6/1945 | United Kingdom | 248/613 |

Primary Examiner—J. Franklin Foss
Attorney, Agent, or Firm—Graham S. Jones, II

[57] ABSTRACT

The vibration filter comprises an inner ring (27) on which vibration-sensitive equipment may be installed, the ring (27) being suspended from a plurality of springs (24, 25, 26) elastically supported by posts (18, 19, 20) in turn mounted on an outer ring (1) which is spring-suspended the same as the inner ring (27) from a rigid bench (8). The springs (12, 13, 14; 24, 25, 26) and other elastic members (9, 10, 11; 15, 16, 17; 21, 22, 23; 28, 29, 30) have differing resonant frequencies.

Between the bench (8) and the outer ring (1), and between the outer and inner rings (1, 27) there may be provided eddy current brakes consisting of strong permanent magnets (46, 48) arranged opposite individual copper or aluminum blocks (5, 47).

10 Claims, 3 Drawing Figures

HIGH-PERFORMANCE VIBRATION FILTER

BACKGROUND OF THE INVENTION

1. Field of the Invention

The invention relates to a high-performance vibration filter for use as a support for apparatus that has to be protected from the most minute ambient vibrations, such as scientific instruments and high precision manufacturing equipment. This filter is intended to absorb, or attenuate, linear (as opposed to rotary) vibrations down to a remaining amplitude of less than $10^{-11}$m.

2. Description of Related Art

Vibration filters known to date in the art are essentially of two types. The first type relies on a comparatively large mass which accordingly has a high resistance against vibration as well as a low resonance frequency. Filters of this type are mainly used as supports for high-precision balances and as benches for optical experiments, for example. The second type of vibration filter uses elastic elements to absorb ambient vibrations, namely rubber blocks or springs. Applications for the second type of filter are in the suspension of vibrating engines, as in motorcars, and in high-fidelity turntables.

The filter to be described pertains to the second type of vibration filter in that it makes use of a specific arrangement of elastic elements, springs and others, in groups having different resonant frequencies.

In addition to the attunation of vibrations achieved by these elastic elements, the invention comtemplates the employment of eddy current brakes having the characteristics of considerably lowering the resonant frequency of the system in which they are used.

Except perhaps for the high precision balances mentioned above, vibration damping known in the art has generally to do with vibrations of an amplitude in the $10^{-6}$m range, and even for record players the requirements do not exceed $10^{-8}$m. Yet modern surface physics investigates objects of atomic size, and the instruments used in these investigations have to be protected from vibrations on the order of atomic magnitude so as not to jeopardize their inspection and measurement.

A similar, yet reverse problem exists in seismology where ambient vibrations are to be investigated, namely the movements of the earth. To obtain meaningful results, seisometers usually comprise means for reducing the resonant frequency of the seismometer itself. From "Elemente der Seismologie und Seismometrie" by E. F. Sawarenski and D. P. Kirnos, Berlin 1960, p. 361, it is known to employ a copper or aluminum bar fixed to the seismometer pendulum and diving into the gap of a permanent magnet of the horse shoe type. Movement of the pendulum and, hence, of the bar causes the generation of Foucault eddy currents in the bar which tend to oppose the pendulum's movements. These eddy current attenuators are not designed for reducing external vibrations as this would be against the purpose of seismometry.

This is also true for the low-frequency seismometer described in U.S. Pat. No. 3,412,376 Johnson in which a pair of balanced coils of a masscoil assembly are concentrically suspended in annular air gaps of a permanent magnetic field by means of a spring suspension system. The attenuation is here achieved by electromagnetic means not present in the vibration filter of the present invention, and the spring suspension system is entirely different.

SUMMARY OF THE INVENTION

The vibration filter of the present invention comprises an at least two-stage mass/spring-and-gibbet arrangement suspended from a rigid bench and supporting vibration-sensitive apparatus, characterized by a first mass hung on a first set of springs attached to gibbets arranged on said bench. The first mass carrying in turn a plurality of gibbets from which a second set of springs hang to support a second mass. The two sets of springs have differing resonance frequencies when suspending their respective mass. Each spring is attached at least at one end to an elastic member having a resonant frequency different from that of its associated spring.

BRIEF DESCRIPTION OF THE DRAWINGS

Details of exemplary embodiments of the invention will hereafter be described with reference to the attached drawings in which.

DESCRIPTION OF THE PREFERRED EMBODIMENT

Figure 1:
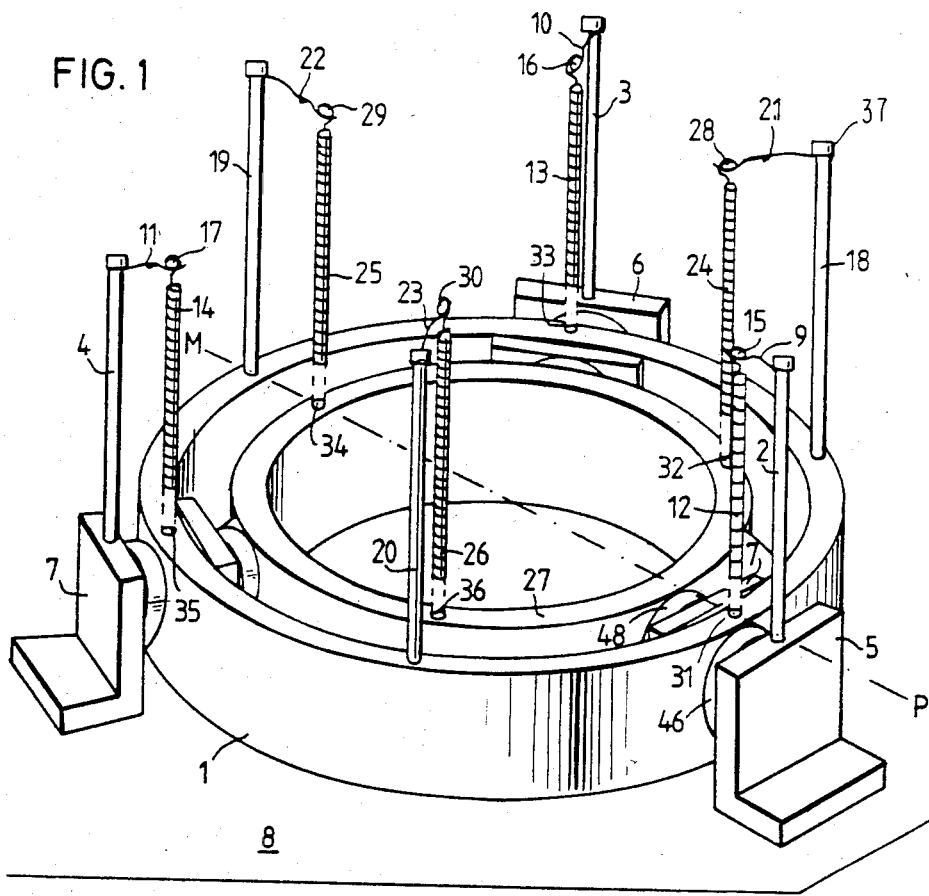
FIG. 1 is a perspective view of the vibration filter of the present invention.

Referring to FIG. 1, a first annular mass 1 is suspended from a set of upright posts 2, 3 and 4 mounted, respectively, to a set of angle brackets 5, 6 and 7 which are fixed on a rigid bench 8. At the top of gibbets 2, 3 and 4 are arranged elastic arms such as wire or leaf springs 9, 10, and 11 pointing towards the axis of annular mass 1 and ending each in a hook. Resting in those hooks are coil springs 12, 13 and 14 the lower ends of which attach to said annular mass 1.

The link between arms 9 through 11 and their associated springs 12 through 14 is fitted with elastic members 15 through 17, such as rubber pads. The elasticity characteristics of the individual parts forming each suspension so far described are chosen such that a vibration generated within, or passed by one of them does not get propagated through the next. In other words, the resonant frequencies of the parts involved are all different.

Annular mass 1 carries posts 18 through 20 which have, at their top ends, elastic members 21 through 23 extending therefrom and ending in hooks from which hang springs 24 through 26. The latter carry a second annular mass 27. Again, the linkage between elastic members 21 through 23 and their associated arms may be made via rubber pads 28 through 30. As described in connection with the suspension of the first annular mass 1, all parts involved in each past/spring assembly have different resonance frequencies.

Figure 2:
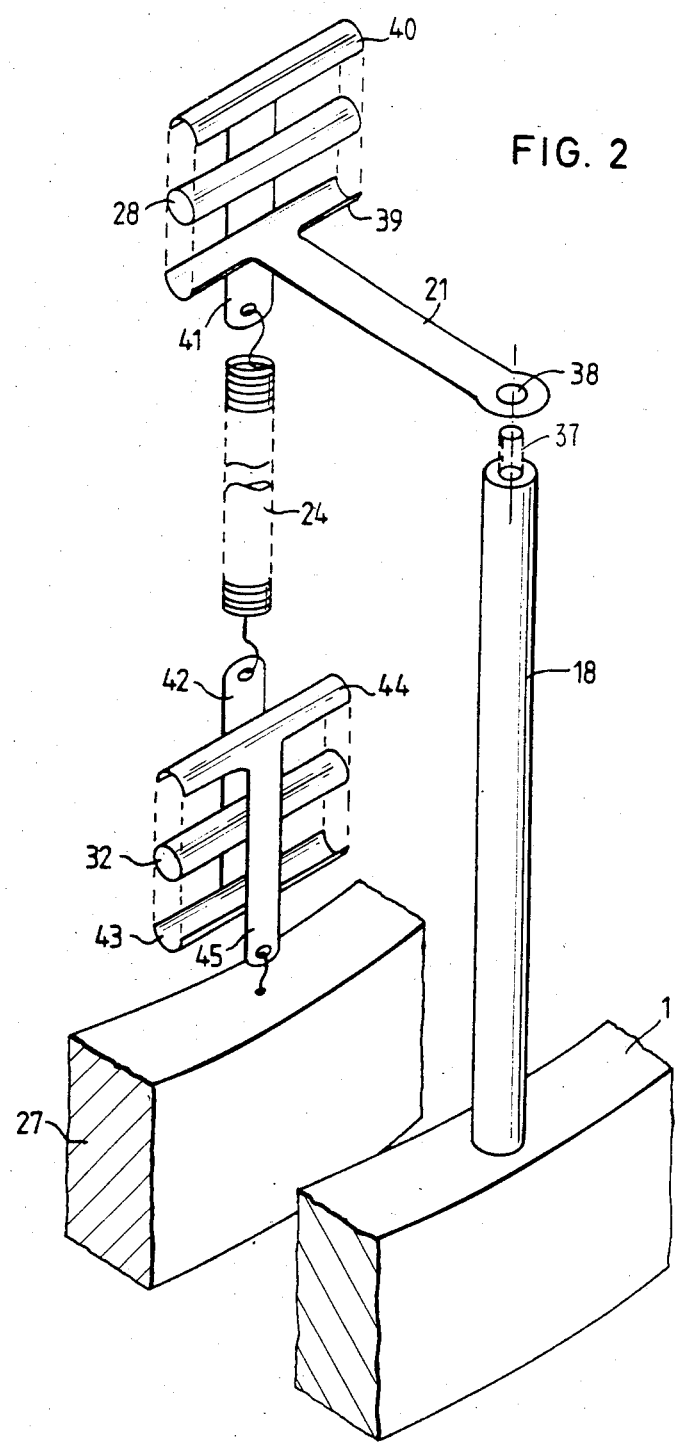
FIG. 2 is a perspective representation of the gibbet/spring arrangement used in the vibration filter.

To improve the vibration absorption effect of the filter, the attachment of springs 12 through 14 and 24 through 26 to annular masses 1 and 27, respectively, is preferably made via elastic members 31 through 36 which may be the same as those designated 15 through 17 and 21 through 23. Details of a preferred spring fixture are shown in FIG. 2, taking as an example the assembly comprising post 18 and spring 24. The remaining assemblies could be essentially identical.

Gibbet 18 consists of a rod simply screwed into annular mass 1 and ending in a thread 37 to which is screwed elastic arm 21 by means of an eye 38. Arm 21 is drawn as a leaf spring but those skilled in the art will know how to replace it by an appropriately shaped wire spring or the like. Arm 21 ends in a hook 39 which may take the form of an upside open shell for receiving an elastic member 28 such as a rubber pad or roll. Roll 28 supports another shell 40 which has a downwardly extending flap 41 from which hangs spring 24. The lower end of spring 24 is hooked into an opening in the flap 42 of another shell 43 which receives elastic member 32 which in turn supports upper shell 44. The latter has an angled flap 45 from which hangs annular mass 27.

Thus, the chain of suspension of mass 27 from mass 1 comprises four elastic links, viz. leaf spring 21, rubber rolls or pads 28 and 32 and coil spring 24. Propagation of vibrations from mass 1 to mass 27 is largely impossible if the elasticity characteristics of the links involved are chosen to differ substantially from one another. It will be obvious that a two-stage arrangement of the kind described, namely between masses 1 and 27 as well as between bench 8/brackets 5 through 7 and mass 1, will effectively attenuate any vibration to which bench 8 might be subjected, so as to guarantee an essentially vibration-free environment on a support 50 which may be secured to mass 27.

Figure 3:
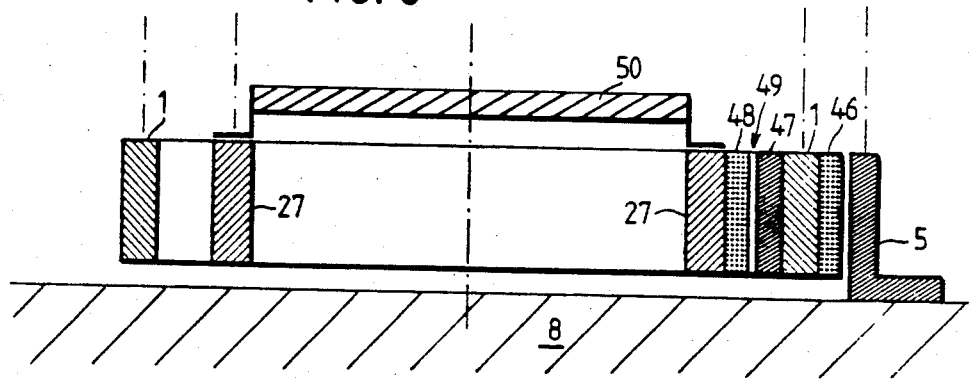
FIG. 3 is a cross-section along line M-P in FIG. 1.

In addition to the passive attenuation means so far described, there is provided at least one set of active attenuators in the form of eddy current brakes. FIG. 3 is a partial cross-section through the vibration filter of the present invention, along line MP in FIG. 1. The bracket 5, which carries one of the posts (2) supporting annular mass 1, consists of an electrically highly conductive material such as copper or aluminum. Facing angle 5 is a permanent magnet 46 having a very high permeability. Between bracket 5 and magnet 46 there is a narrow air gap the geometry of which together with the permeability of magnet 46 and the parameters of the material used for bracket 5 determine the eddy current forces created when a movement occurs between magnet 46 and angle bracket 5, i.e., between bench 8 and mass 1.

The eddy current brake is repeated in that mass 1 carries a copper or aluminium bar 47, and mass 27 carries a permanent magnet 48 facing said bar 47 across an air gap 49. Thus, movement between masses 1 and 27 is opposed by this brake. This two-stage braking system very effectively attenuates any vibrations, and is, hence, also effective against those vibrations which might be generated by the measurement or manufacturing equipment installed on a table 50 rigidly mounted on mass 27.

As mentioned above, there are modern scientific instruments as well as manufacturing steps which require protection even from vibrations with an amplitude of less than $10^{-11}$m. One example will be briefly discussed. An instrument permitting the inspection of surface structures down to atomic dimensions and even making individual atoms visible is the Scanning Tunnelling Microscope described in our European Patent Publication No. 0 027 517. A very sharp point is kept at a constant distance from an electrically conducting surface, such that tunnelling occurs when there is an appropriate potential difference across the gap between point and surface. The gap width is maintained constant by a piezoelectric servo mechanism the control signal of which is used to energize a plotter while the point is scanned across the probe to be investigated. Single-atom structures have been made visible with this microscope, and it will be obvious that any vibrations having an amplitude above $10^{-11}$m will grossly impair the accuracy of reproduction of the scanned surface.

The Scanning Tunnelling Microscope is mostly used in a vacuum environment in order to avoid adhesion of molecules of the ambient atmosphere on the surface to be inspected. Also, any residual humidity possibly adhering to the surface and to the microscope itself has to be removed. To this end, the vessel in which the apparatus is housed should be baked out at about 500 K. Accordingly, the vibration filter, which of necessity will have to be an integral part of the microscope must be capable of repeatedly sustaining vacuum and baking. This primarily affects its elastic links, viz. the springs and the rubber pads or rolls, and the springs should, therefore, be made of special steel and the rubber of synthetic caoutchouc (rubber).

In the accompanying figures masses 1 and 27 are depicted as circular rings, and this should not be taken as a limitation. Other structures are certainly well within the reach of those skilled in the art. Also, while there are three post/spring arrangements and three eddy current brakes used on each ring, their number may of course be varied as needed.

Having thus described our invention, what we claim as new, and desire to secure by Letters Patent is:

1. In a vibration-free mechanical support system including a mechanical vibration filter for providing vibration-free mechanical support,
said system employing elastic elements to connect a suspended mass to a base element,
the improvement comprising employing a plurality of said elastic elements to support said mass, with a series of said elastic elements connected in a series,
with each of said elastic elements connected in a series having a different resonant frequency from each other in order to minimize coupling of vibration from one of said elastic elements connected in a series and supporting said suspended element through another of said elastic elements connected in said series,
whereby vibration of said mass is minimized.

2. In a vibration-free mechanical support system including a mechanical vibration filter for proving vibration-free mechanical support,
said system employing elastic elements to connect a suspended mass to a base element,
the improvement comprising employing a plurality of said elastic elements to support said mass,
with each of said elastic elements having a different resonant frequency in order to minimize coupling of vibration from one of said elastic elements supporting said suspended element through another of said elastic elements, whereby vibration of said mass is minimized,
wherein said filter includes a series of said elastic elements connected in a series,
with each of said elements connected in series having substantial differences in structure and substantial differences in resonant frequency from each other.

3. A support system in accordance with claim 2 wherein a first one of said elastic elements in a series arrangement comprises an elastic spring element, and a second one of said elastic elements comprises an elastomeric element.

4. A support system in accordance with claim 3 wherein said elastic spring elements include coil springs and elongated bendable spring elements connected in a mechanical series arrangement.

5. In a vibration-free mechanical support system including a mechanical vibration filter for providing vibration-free mechanical support,
   said system employing elastic elements to connect a suspended mass to a base element,
   the improvement comprising employing a plurality of said elastic elements to support said mass,
   with each of said elastic elements having a different resonant frequency in order to minimize coupling of vibration from one of said elastic elements supporting said suspended element through another of said elastic elements, whereby vibration of said mass is minimized,
   wherein a braking mechanism is connected between said mass and said support to resist motion of said mass.

6. A support system in accordance with claim 5 wherein said braking mechanism comprises electromagnetic means.

7. A support system in accordance with claim 5 wherein said braking mechanism comprises eddy current means.

8. A vibration filter comprising
   an at least two-stage mass/spring-and-post arrangement suspended from a rigid bench and supporting vibration-sensitive apparatus, characterized by
   a first mass (1) hung on a first set of springs (12, 13, 14) attached to a plurality of posts (2, 3, 4) arranged on said bench (8),
   said first mass (1) carrying in turn a plurality of posts (18, 19, 20) from which a second set of springs (24, 25, 26) hang to support a second mass (27), the two sets of springs (12, 13, 14; 24, 25, 26) having different resonance frequencies when suspending their respective masses (27; 1 and 27), and
   each spring (12, 13, 14; 24, 25, 26) being attached at least at one end to an elastic member (15, 16, 17; 28, 29, 30), said spring having a resonant frequency different from the resonant frequency of its associated spring (12, 13, 14; 24, 25, 26)

9. A vibration filter comprising
   an at least two-stage mass/spring-and-post arrangement suspended from a rigid bench and supporting vibration-sensitive apparatus, characterized by
   a first mass (1) hung on a first set of springs (12, 13, 14) attached to a plurality of posts (2, 3, 4) arranged on said bench (8),
   said first mass (1) carrying in turn a plurality of posts (18, 19, 20) from which a second set of springs (24, 25, 26) hang to support a second mass (27), the two sets of springs (12, 13, 14; 24, 25, 26) having different resonance frequencies when suspending their respective masses (27; 1 and 27), and
   each spring (12, 13, 14; 24, 25, 26) being attached at least at one end to an elastic member (15, 16, 17; 28, 29, 30) having a resonant frequency different from that of its associated spring (12, 13, 14; 24, 25, 26),
   characterized in that each of the post (2, 3, 4, 18, 19, 20) has an elastic arm (9, 10, 11, 21, 22, 23) extending from its top for supporting its associated spring (12, 13, 14, 24, 25, 26), and that the resonance frequency of said arm is different from that of its associated spring.

10. A vibration filter comprising
    an at least two-stage mass/spring-and-post arrangement suspended from a rigid bench and supporting vibration-sensitive apparatus, characterized by
    a first mass (1) hung on a first set of springs (12, 13, 14) attached to a plurality of posts (2, 3, 4) arranged on said bench (8),
    said first mass (1) carrying in turn a plurality of posts (18, 19, 20) from which a second set of springs (24, 25, 26) hang to support a second mass (27), the two sets of springs (12, 13, 14; 24, 25, 26) having different resonance frequencies when suspending their respective masses (27; 1 and 27), and
    each spring (12, 13, 14; 24, 25, 26) being attached at least at one end to an elastic member (15, 16, 17; 28, 29, 30) having a resonant frequency different from that of its associated spring (12, 13, 14; 24, 25, 26)
    characterized in that there is provided at least one eddy current brake (5, 46; 47, 48) operative between said bench (8) and said first mass (1), and/or between said first and second masses (1, 27),
    consisting of a permanent magnet (46, 48) facing but not touching a block (5, 47) of electrically highly conductive material.

* * * * *